US012337357B2

(12) United States Patent
Lopiccolo et al.

(10) Patent No.: US 12,337,357 B2
(45) Date of Patent: Jun. 24, 2025

(54) METHODS AND SYSTEMS FOR ONLINE CLEANING OF BEVERAGE FILLERS

(71) Applicant: CHEMTREAT, INC., Glen Allen, VA (US)

(72) Inventors: David Lopiccolo, Skaneateles, NY (US); Victor Merino, Tlalnepantla de Baz (MX); Rick Brundage, Richmond, VA (US)

(73) Assignee: CHEMTREAT, INC., Glen Allen, VA (US)

(*) Notice: Subject to any disclaimer, the term of this patent is extended or adjusted under 35 U.S.C. 154(b) by 54 days.

(21) Appl. No.: 17/138,412

(22) Filed: Dec. 30, 2020

(65) Prior Publication Data

US 2021/0299708 A1 Sep. 30, 2021

Related U.S. Application Data

(60) Provisional application No. 63/001,904, filed on Mar. 30, 2020.

(51) Int. Cl.
*B08B 3/02* (2006.01)

(52) U.S. Cl.
CPC .................................... *B08B 3/022* (2013.01)

(58) Field of Classification Search
CPC ......... B08B 3/022; B67C 3/005; B67C 3/001; B67C 7/00; B67C 7/0006; B67C 7/0013; B67C 7/0026; B67C 7/0073; B67C 7/008
See application file for complete search history.

(56) References Cited

U.S. PATENT DOCUMENTS

| | | | | |
|---|---|---|---|---|
| 3,559,563 | A * | 2/1971 | Brenner | B67C 7/0033 53/111 R |
| 6,423,675 | B1 | 7/2002 | Coughlin et al. | |
| 2010/0139709 | A1* | 6/2010 | Saefkow | B65B 55/10 134/32 |
| 2015/0298178 | A1* | 10/2015 | Hayakawa | B67C 7/0073 134/22.1 |
| 2016/0046475 | A1* | 2/2016 | Hayakawa | B67C 3/005 134/22.18 |
| 2016/0185584 | A1* | 6/2016 | Hayakawa | B67C 7/0073 53/426 |
| 2017/0065121 | A1 | 3/2017 | Roberts et al. | |
| 2017/0290938 | A1* | 10/2017 | Hayakawa | B08B 9/0325 |
| 2019/0071295 | A1* | 3/2019 | Clüsserath | B67C 7/004 |
| 2020/0048064 | A1* | 2/2020 | Hayakawa | B67C 3/001 |
| 2020/0079635 | A1* | 3/2020 | Yuse | B67C 7/0053 |
| 2021/0299708 | A1* | 9/2021 | Lopiccolo | B67C 3/001 |
| 2022/0024747 | A1* | 1/2022 | Clüsserath | B67C 3/005 |

FOREIGN PATENT DOCUMENTS

| | | |
|---|---|---|
| EP | 3202705 | 10/2019 |

* cited by examiner

*Primary Examiner* — Sharidan Carrillo
(74) *Attorney, Agent, or Firm* — Oliff PLC

(57) ABSTRACT

A method and system for cleaning a beverage filler. The method and system includes storing a cleaning solution, and delivering the cleaning solution to the filler via a nozzle arrangement configured to distribute the cleaning solution to clean a portion of the filler. The cleaning solution is delivered to the filler during online operation of the filler.

16 Claims, 8 Drawing Sheets

METHODS AND SYSTEMS FOR ONLINE CLEANING OF BEVERAGE FILLERS

This application claims priority to Provisional Application No. 63/001,904, filed Mar. 30, 2020. The entire contents of the prior application are hereby incorporated by reference herein in their entirety.

TECHNICAL FIELD

This application relates to methods and systems for applying cleaning solutions to beverage filler systems while the systems are online during filling operations.

BACKGROUND

Beverage filler systems are subject to ongoing contamination by the beverage to be filled. Contamination may result from product cast off, dripping, foaming, or the like, during filling operations. The moist contaminated regions of the filling system form an ideal environment for growth of yeast, molds, bacteria and other microorganisms. As such, it is essential to clean components of the filling system that are subject to contamination in order to ensure a hygienically and aesthetically acceptable filling operating environment per FDA/USDA (or other governmental regulatory body like Health Canada) and/or company specific Quality Assurance specifications.

In particular, during carbonated soft drink (CSD) filling operations, there is frequently product 'overspill' and associated 'cast off'. This overspill on the outside of the package, in combination with the rotational speed of the filler, results in product spillage being 'cast off' into the internal components of the filler system and onto the filler external surfaces. When this product cast off is allowed to accumulate it becomes a 'soil' which presents problems for the beverage facility. Soils provide a growth environment for yeast, mold and bacteria. The accumulation of these soils currently requires the facility to completely stop filling operations, shut down the production line to perform an Open Plant Cleaning (OPC). During OPC, an FDA approved surface cleaner is 'foamed' and applied onto the filler, then manually scrubbed, and pressure washed to return to an acceptable level of cleanliness as determined by the client Quality Assurance Department.

Stopping operation results in lost production time and production efficiency. Each stoppage and associated OPC cleaning event consumes chemistry, energy, water and manpower. Any reduction in the soil level accumulation can result in extended operational runs between required cleanings. Extended production runs allow the client to produce more product per installed asset thereby increasing overall key performance indicators (KPIs).

Further, an overall cleaner production surface improves overall product quality, quality KPIs, protects product brand, consumer safety, and has a direct impact on profitability via a direct measurable reduction in the amount of water, OPC chemistry, energy, time and manpower required per unit operation.

SUMMARY

Currently, there are no approved online filler cleaning programs for Carbonated Soft Drink (CSD) fillers which will maintain filler cleanliness during filling operation. All current CSD fillers must shut down (such that production stopped) in order to clean in accordance with FDA and/or individual corporate quality assurance protocols.

The inventors discovered that by applying a beverage-safe filler cleaner comprised of a blend of chemistries combined with control technology and a pressurized water delivery system to the critical areas of the filler system (soil accumulation areas), it is possible to keep the filler system cleaner longer during production runs. Moreover, when the filler system comes down for required cleaning, there is less soil build up. This results in less chemical use, cleaning time, energy, and water required, and an overall measurable improvement in the cleanliness of the filler internal and external system components, as measured with biological sampling techniques.

The net impact of the disclosed embodiments is a direct reduction in CSD Manufacturer's cost per case (i.e., OPEX), reduction in sustainability KPIs such as water use ratio, waste water use ratio, energy use ratio and higher overall plant quality KPIs.

In a first embodiment, there is provided a method for online cleaning of a carbonated beverage filler device. The method includes storing a cleaning solution, and delivering the cleaning solution to the carbonated beverage filler device via a pressurized nozzle arrangement configured to distribute the cleaning solution to clean at least a portion of the carbonated beverage filler device. The cleaning solution is delivered to the carbonated beverage filler device during online operation of the carbonated beverage filler device.

In a second embodiment, there is provided a system for online cleaning of a carbonated beverage filler device. The system includes a storage unit configured to store a cleaning solution, and a delivery device configured to receive the cleaning solution from the storage unit and deliver the cleaning solution to the carbonated beverage filler device via a pressurized nozzle arrangement configured to distribute the cleaning solution to clean at least a portion of the carbonated beverage filler device. The cleaning solution is delivered to the carbonated beverage filler device during online operation of the carbonated beverage filler device.

DETAILED DESCRIPTION

In the disclosed embodiments, a cleaning solution is applied to a beverage filler system during operation, i.e., while the system is online and in use and filling packages with final beverage products for distribution to supply chain and ultimately end consumer. According to the disclosed online methods, the filler system may be conditioned for longer production runs, thereby increasing overall operational capacity and better outcomes than previously attainable using conventional cleaning methods that require stoppage and manual cleaning.

As used herein, the term "online" refers to the cleaning chemistry being applied while the filler is operational and filling packages, i.e., "online," during package filling operations, as opposed to being "offline" when production, filling and/or operation ceases.

As used herein, the term "carbonated beverage" refers to a beverage infused with carbon dioxide by dissolving carbon dioxide in the beverage under pressure such that when the pressure is removed (e.g., by opening a bottle) the carbon dioxide is released in the form of bubbles, as opposed to natural carbonation resulting from fermentation (e.g., as in the case of beer).

The disclosed online methods are particularly suitable for carbonated soft drinks. However, it will be appreciated that disclosed embodiments are not so limited. In this regard, disclosed methods are applicable to other beverages including, but not limited to, beer, mineral water, juice, wine, spirits, other alcoholic beverages, non-alcoholic mixed beverages, fluid milk, milk products, dairy, as well as any variety of 'flowable' processed food products.

The Filler System

The carbonated soft drink beverage filler system operated on by the disclosed online methods may be of any suitable type. In general, a beverage filling plant includes at least one beverage filling device having a filling head, a conveyer device for packages which are generally conveyed in a circulatory fashion, and an apparatus for closing (e.g., a closing unit) the filled packages (e.g., by means of crown stoppers, screw stoppers, the top of a package, or the like), which, viewed in the conveyance direction, follow onto the beverage filling device. The beverage filler system may include additional modules which may include fully automatic feed devices for the empty packages as well as fully automatic packaging of the filled packages, e.g., in boxes, cartons, or the like, using packaging devices.

Figure 1:
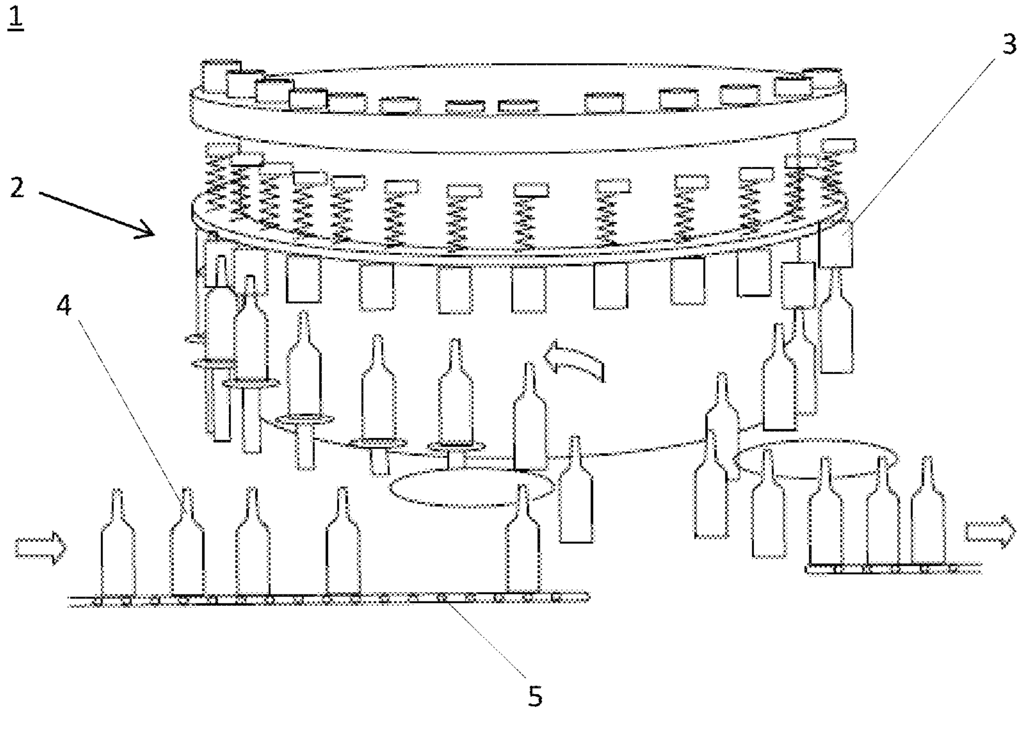
FIG. 1 RELATED ART
FIG. 1 is a perspective view of a conventional beverage filler system.

FIG. 1 illustrates one such conventional beverage filler system-a beverage filling system 1 in this example. In this beverage filling system 1, there is provided a beverage filling device 2 having a filling heads 3 that allow a beverage to be filled into packages 4 conveyed on a conveyor device 5. The packages may be, for example, bottles, cans, small packages, or the like. Empty packages/containers are fed to the device via a conveyor device, such as a conveyor belt. During filling operations, a beverage overspill may be released from the bottle causing contamination of the conveyer belt. Subsequent dripping of beverage from the filling head may also contaminate the belt during the onward conveyance of a filled bottle from the filling head and while an empty bottle is forwarded below the filling head.

The Delivery Architecture

Figure 2:
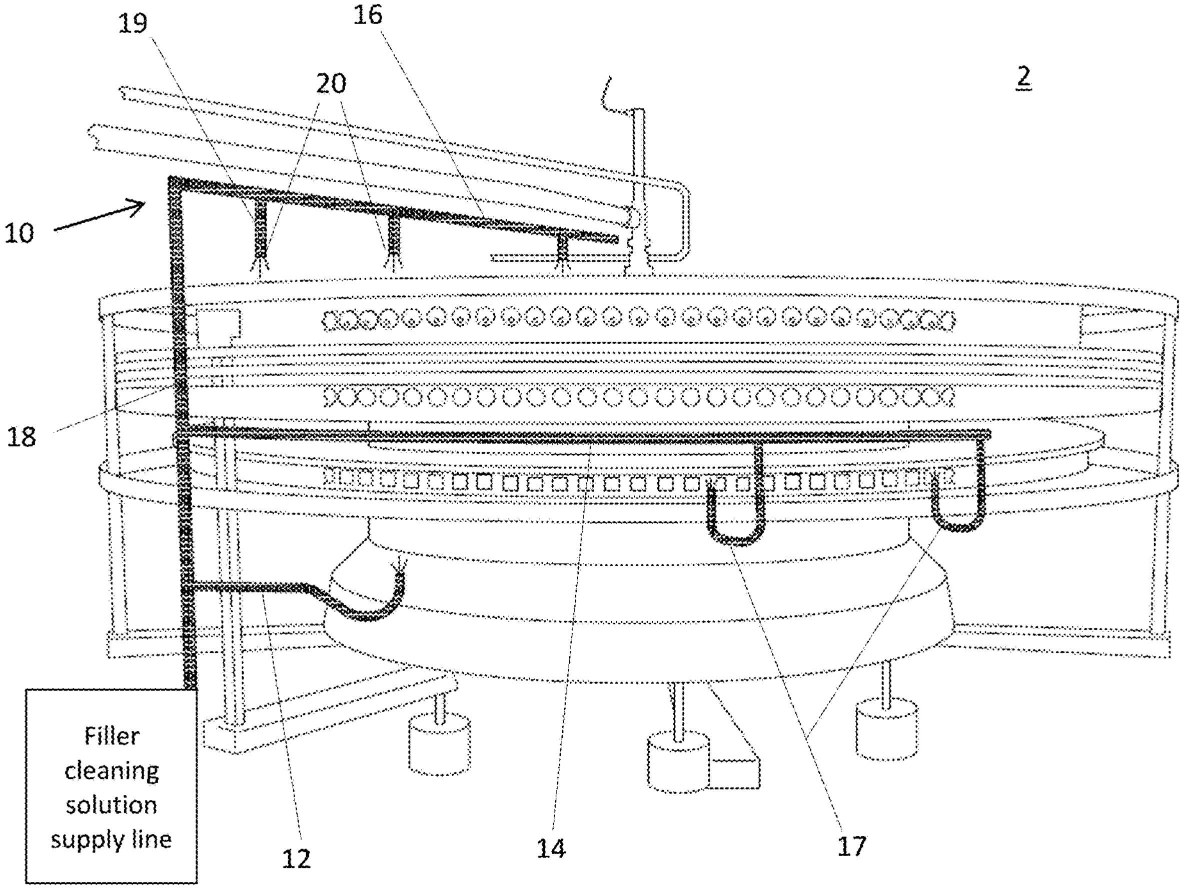
FIG. 2 is a perspective view of a treatment system for applying a treatment solution to a beverage filler system according to an embodiment.

FIG. 2 illustrates a delivery architecture 10 for applying a treatment solution, such as a cleaning solution, to a filler device 2 according to embodiments. During the filling procedure, i.e., while the system is online, cleaning solution is sprayed according to a controlled pattern, e.g., continuously or intermittently, onto the filling system and its components, e.g., onto its filling head as well as onto the bottles and the conveyer belt, by way of the delivery architecture 10. The delivery architecture 10 creates an 'envelope of treatment' above, in front of, behind and under the filler system that operates on upper portions, lower portions and intermediate portions of the filler system, as discussed a further below. This would include the 'external facing' surfaces along with those 'internal facing' surfaces. Essentially ensuring the Filler Cleaner Chemistry when properly applied will 'follow' the beverage cast of and protect all external surfaces of the filler matching.

In the course of this treatment, the system components are preferably rinsed at suitable pressures and temperatures with the cleaning solution within and around the filling chamber. In this regard, it is important to subject the conveyor components and packages to rinsing in the filling chamber and to further rinsing after progressing outside of the filling chamber.

Downstream of the filling chamber, liquid residues or contaminated regions, which may contain product, may still be present on the surfaces of the conveyor components and packages. In addition, it is possible that, while the packages are still open, further product may spill therefrom due to the movement of the packages caused by the conveyor belt or by collisions of packages on the conveyor belt. The nozzle arrangement of the delivery architecture can be configured to spray cleaning solution at each of these "problem" points.

The conveyer device may be a link chain having open interstitial spaces. In this case, liquid residues may drip onto the part of the conveyer device, situated underneath, returning back to the filling chamber (if the conveyer device circulates). The conveyer device should be cleaned not only on its upper side but also on its underside as well as on the upper and underside of the returning part beneath the conveyer device between the filling chamber and the device for closing the packages.

The conveyer belt may have a closed surface. In this case, it may be that only the upper side of the belt moving towards the device for closing the packages needs to be cleaned.

In any event, the conveyer device, if circulated, may be cleaned again in the same manner before returning into the filling chamber in order to remove whatever contaminations may have re-occurred.

A final rinse may be set up to rinse both the complete package post-filling/-closure operation and the conveyor belt carrying the filled packages on to the next steps in the production flow. In this regard, there is a significant benefit to facilities having post-filling water-centric operations like bottle warmers/coolers where the reduction of any/all organic foulants from the filler will further improve downstream operations in terms of improved cleanliness, less water and chemical consumption and improved quality KPIs.

As seen in FIG. 2, the delivery architecture 10 includes main pipe 18 for delivery a cleaning solution from a source to branch pipes 12, 14 and 16. Branch pipes 12, 14 and 16 in turn provide cleaning solution to outlets 19 and u-shaped outlets 17. The outlets 17 and 19 include nozzles 20 for spraying the cleaning solution to the target area.

In embodiments, the target area may be any one or more parts or portions of the filler device 10 including the above-described problem areas. The delivery architecture 10 may be specifically configured or designed to clean target areas. Target areas may be predetermined or known patterns learned via historical efficacy data and/or through machine learning algorithms implemented on general or specialized processing devices or controllers. Target areas may include 100% or any suitable or required surface area of the filler device 10. For example, the target area may include in a range of 0.1% to 99.9%, 1% to 99%, 10% to 99%, 20% to 99%, 30% to 99%, 40% to 99%, 50% to 99%, 60% to 99%, 70% to 99%, 80% to 99%, 1% to 95%, 10% to 95%, 20% to 95%, 30% to 95%, 40% to 95%, 50% to 95%, 60% to 95%, 70% to 95%, or 80% to 95%, of the total area of the filler device 10.

The nozzles 20 may be any suitable type of nozzle. In embodiments, the nozzle may be a pressurized nozzle. The pressurized nozzles are disposed in a particular arrangement suitable for cleaning the desired filler system, i.e., the nozzles may be application specific per filler/facility to achieve both FDA and client quality assurance KPIs. Nozzle configuration can easily be modified based on visual observation of trouble soil areas and/or analytical Quality Assurance testing to ensure the best overall coverage and maximize the effeteness of the application. The nozzles may also be broad jet nozzles, flat jet nozzles, high intensity nozzles, or the like. Liquid residues of the cleaning agent mixed with beverage remain on the surfaces of the filler system and conveyer belt. The delivery architecture 10 is configured to spray the cleaning agent from upper and lower sides of the filler device 2, and at various inclinations/directions.

The configuration of the delivery architecture 10 may be specifically designed to effect the above-described 'envelope of treatment' by covering the target area(s). For example, the configuration of the branch pipes and nozzles may be specifically designed to achieve this effect, e.g., by intentionally locating and arranging the branch pipes and nozzles at the requisite positions. Alternatively, or in addition to the above, the branch pipes and nozzles themselves may be specifically configured to cover the target area(s) by including, for example, swivel bases, lever arms, retractable components, or other 2D and 3D rotational devices known in the art. Each of the above components, individually and in combination, may be controlled by a controller or processing device.

The delivery architecture 10 may also be configured to spray onto areas upstream and downstream of the filler device 2. For example, the delivery architecture 10 may extend to an upper side of the conveyor belt 5 (seen in FIG. 1) returning to the filling chamber so as to spray onto the upper side and underside in order to rinse away the liquid residues dripping from above. The underside and the exterior of the conveyer belt 5 may also be sprayed.

Instead of the individual nozzles 20 as shown, it is also possible for a plurality of single nozzles arranged transversely to the conveyance direction to be provided side by side which, jointly, span the width of the belt 5. Prior to the re-entry of the belt returning into the filling chamber, it may be rinsed again, for example prior to the reversal locality, by means of the nozzle arrangement. In this regard, the nozzles 20 may in each case be located transversely to the conveyance direction and parallel to the chain links.

For cleaning the conveyor device 5, it is possible to employ in the upwards-directed regions of the belt (i.e., the upper regions of the conveyer device leading away from the filling device 2 as well as the lower region of the conveyer device returning in the direction of the filling device) nozzles which are directed inclined to the surface in order to rinse the contaminations through the empty spaces between chain links, from there to drip downwardly. In this context, the lowermost nozzle may be (in relation to the lower belt section) be arranged downstream of the upper flat jet nozzle, so that the liquid residues which drip from the last mentioned nozzle onto the lower belt section, can be removed by the first mentioned nozzle.

The cleaning solution is preferably sprayed from the nozzles directly onto the objects, i.e., system components, conveyors, or packages to be protected from potential contamination. In the case of filling facilities which are online and in use, broad jet nozzles may be used for cleaning the filling device. Additional nozzles may be employed for the cleaning of the packages and the conveyer device.

It will be recognized that disclosed embodiments are not limited to the delivery architecture illustrated in FIG. 2. Any suitable architecture, design and/or nozzle arrangement may be employed so as to most effectively clean or re-clean the filler system based on the specific design and requirements of that system.

The Cleaning Solution

The cleaning solution employed by the disclosed embodiments is not particularly limited. By way of example, and for purposes of illustration, disclosed embodiments will be further described with respect to an acidified sodium chlorite solution. But it should be recognized that the disclosed embodiments are not so limited and that any suitable solution that cleans surfaces of the components of a beverage filling system is contemplated.

An acidified sodium chlorite solution may be obtained by mixing sodium chlorite solution, such as ChemTreat CP2043, with citric acid, such as ChemTreat CP1708, which are both stable, to produce short-lived acidified sodium chlorite (ASC) which has potent decontaminating properties. ASC is used for sanitation of the hard surfaces which come in contact with food and as a wash or rinse for a variety of foods including red meat, poultry, seafood, fruits and vegetables. Upon mixing the main active ingredient, chlorous acid is produced in equilibrium with chlorite anion.

To the extent that precursor chemicals are employed, the specific proportion of the precursor chemicals may vary with pH, temperature, and other factors, based on the specific requirements of the system. In embodiments, the proportions may range from approximately 5-35% chlorous acid with 65-95% chlorite, or preferably in a ratio of 3.5:1 of sodium chlorite to citric acid. More acidic solutions result in a higher proportion of chlorous acid. Chlorous acid breaks down to chlorine dioxide which in turn breaks down to chlorite anion and ultimately chloride anion. Because the oxo-chlorine compounds are unstable when properly prepared, there should be no measurable residue on food or beverage if treated appropriately.

In embodiments, ASC may in exceptional cases be employed at up to 100%, i.e., in the extreme case, but more frequently at up to 50% of the cleaning agent, the remainder being water. However, in general it is added to water (e.g., ordinary tap water) in amounts of 0.1 to 10% in order to obtain the cleaning agent used according to embodiments.

According to embodiments, the cleaning of the parts of the filling system contaminated by the beverage product and by microorganisms is performed continuously or intermittently (at time intervals) during the operation of the filling line at specified delivery rates and concentrations, which may be fixed or variable as required. Intermittent cleaning is advantageous whenever water is to be saved. In that case, the time intervals are determined by the degree of contamination of the plant. Thus, the cleaning may, e.g., be performed synchronously (but not limited to) every 3, 5, 7, 10, 15, 30 minutes for 30 seconds, 1 minute, 2 minutes at a time. In a preferred embodiment, the cleaning solution is sprayed for any suitable number of cycles, each having in a range of 15 seconds to 2 minutes of continuous delivery followed by in a range of 12 minutes to 15 minutes of continuous no delivery, and more preferably, 1 minute on and 14 minutes off. Final determination will depend on both quantitative testing and qualitative observations. Final determination may be based on historical efficacy data and/or through machine learning algorithms implemented on general or specialized processing devices or controllers.

The installation and design of the delivery architecture may be customized accordingly, e.g., by employing further nozzles for spraying additional parts of the filler, packages, and/or facility into which the beverage is to be filled, is being filled or has already been filled, may have to be performed additionally when desired or required.

According to preferred embodiments, the cleaning solution can be sprayed during the filling operation while online. The cleaning solution may also be applied before filling commences, or after filling finishes.

The cleaning agent may be sprayed at ambient temperature or any suitable temperature depending on system requirements.

The cleaning agent may be sprayed at any suitable pressure depending, for example, on system requirements.

The cleaning agent is apportioned to the nozzles at any suitable rate and may be dependent on system or environmental requirements.

The Cleaning Solution Delivery Source

Figure 3:
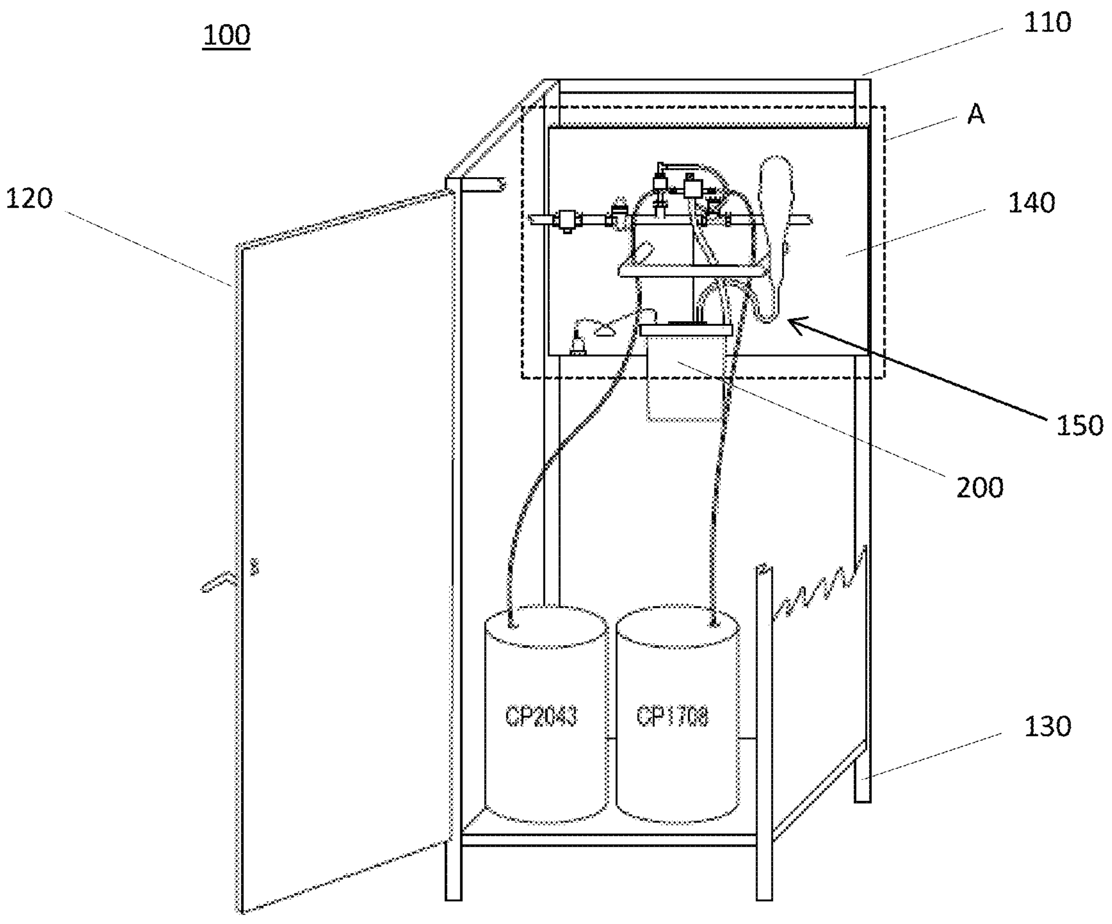
FIG. 3 is a schematic view of a system for mixing compositions to form a treatment solution according to an embodiment.

With reference to FIG. 3, the delivery architecture 10 is sourced with cleaning solution via the delivery source system 100 that is directly connected to the filler system to ensure the cleaning solution is only applied during suitable times and durations via a programmable logic controller (PLC) interlock with client filler operations. In embodiments, the delivery source system 100 may include chemical feed skid, an (optional) stainless steel cage 110 (e.g., 36"×24"×72"), with a lockable door 120, adjustable feet 130, which may be mountable to the floor, a back plate 140 to mount chemical feed components generator parts, a guard (not shown) for the top of the holding tank 200, and one chemical feed skid 150 per filler.

Figure 4:
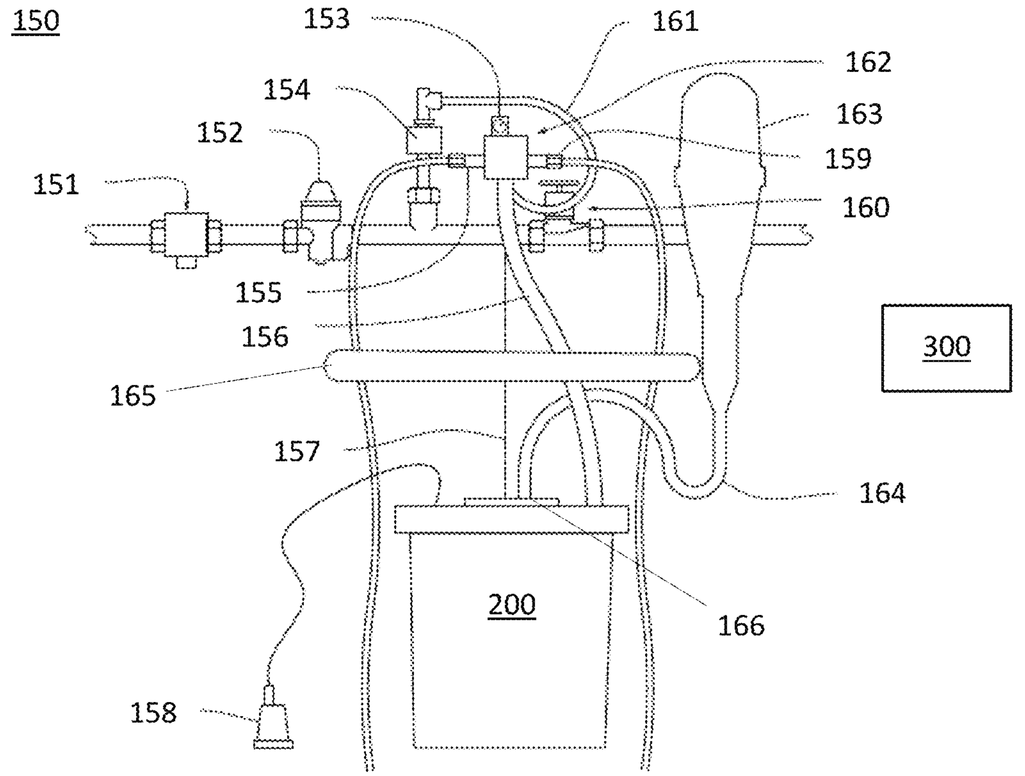
FIG. 4 is a schematic view of the cut-out box "A" in the system shown in FIG. 3.

FIG. 4 illustrates a close-up view of the chemical feed system 150 (box "A") in FIG. 3. As seen in FIG. 4, the chemical feed system includes a supply tank 200 (e.g., a 3 gallon tank), back flow preventer 151, pressure regulator 152, pressure gauge 153, overflow solenoid 154, keeper 155 (e.g., a stainless steel check valve), tank supply hose 156, float chain 157, overflow sensor 158, which should be mounted away from the supply tank, activator 159 (including, e.g., a stainless steel check valve, hose barb and ⅜ inch supply hose and name tag), main solenoid 160 (e.g., a ¾ inch solenoid), "T" mixing block water supply line 161, mixing block with float controlled valve 162, dosatron proportioning pump 163, dosatron hose 164, nose guard 165 and tank lid 166.

In operation, the flows of two the chemistries, ChemTreat CP2043 and ChemTreat CP1708, are controlled by the combined structure of the keeper 155, activator 159 and float controlled valve 162 to provide a specific ratio of cleaning solution to the supply tank 200. Water flow from a source (e.g., a municipal water source) is fed to the dosatron proportioning pump 163. The dosatron proportioning pump 163 controls deduction, i.e., it optimizes pressure, flow and dosage, in the feed water line going to the spray nozzles of the delivery architecture 10. In so doing, drive water coming through the dosatron proportioning pump 163 picks up controlled amounts of solution stored in the supply tank 200 via the dosatron hose 164 in route to the spray nozzles. The pressure of the cleaning solution dispensed at the nozzles may be based on cleaning solution ratio, number of cleaning cycles, and prior quantitative and/or qualitative analysis.

The cleaning solution is applied via an engineered system of pressurized spray nozzles, such as delivery architecture 10, a metered dosage system, with electronic integration via PLC to plant operations. Depending on the operation, the chemistry may be applied in 'neat' form or may require potable/high purity water dilution (via several existing methods) to achieve proper cleaning application point concentrations, results and comply with industry regulations. A controller 300 may also be provided for controlling supply of the cleaning agent to the delivery architecture 10 according to any suitable pattern of apportionment to specific nozzles in the nozzle arrangement depending on various needs or requirements of the system.

Food grade cleaners approved for food contact defined by country of origin examples—FDA, USDA, CFIS, Heath Canada, or the like. There will be a regulatory approval process for each country of operation and each client, which may affect the overall design and implementation of the disclosed methods and systems.

EXAMPLES

In the following working examples, the disclosed online cleaning methods were conducted on various components of a beverage filling system as follows: valves and pistons (Example 1), springs (Example 2), portion behind the pistons (Example 3) and filler doors (Example 4). In each case, the relevant system components exposed to the online cleaning methods were compared to a control sample of similar system components not exposed to the online cleaning methods. The results are illustrated in FIGS. 5A-8B and are summarized as follows.

In each example, the client beverage facility ran for 14 days of operation, shut down and pictures were taken prior to conducting an OPC. Following the OPC and sign off by client quality assurance staff, the disclosed system was put online for 14 days of similar operations. The system was then shut down and photos taken again prior to OPC in order to compare apples—to apples performance and collect qualitative (pictures) and quantitative (biological) data.

Example 1

Figure 5A:
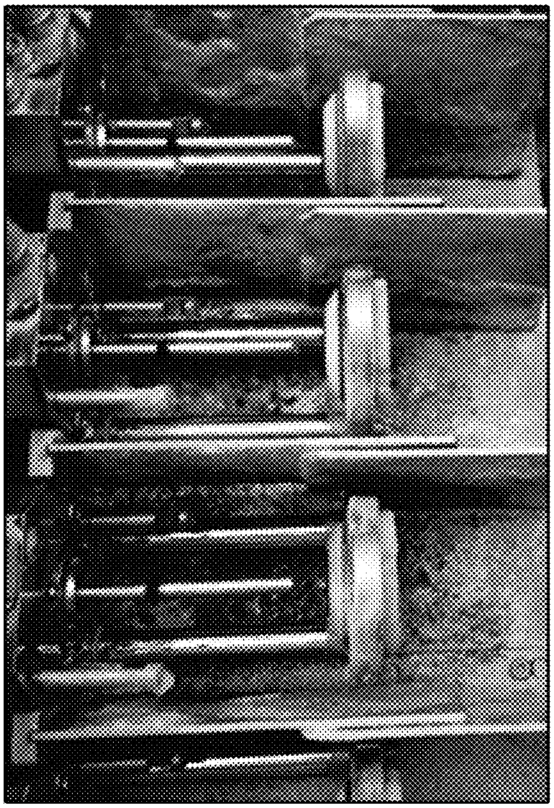
FIGS. 5A and 5B are photographs of valves and pistons of a filler system without (FIG. 5A) and with (FIG. 5B) application of a treatment solution according to an embodiment.
Figure 5B:
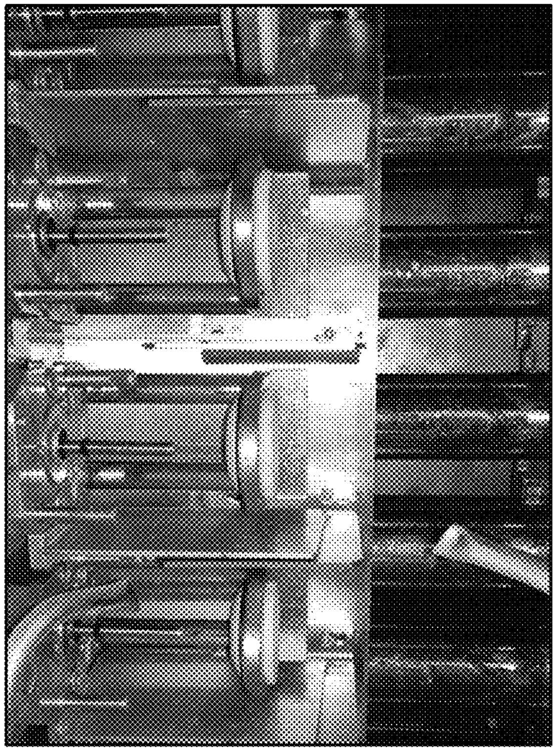

FIGS. 5A and 5B shows valves and pistons of a filler system without (FIG. 5A) and with (FIG. 5B) application of a treatment solution according to an embodiment.

Example 2

Figure 6B:
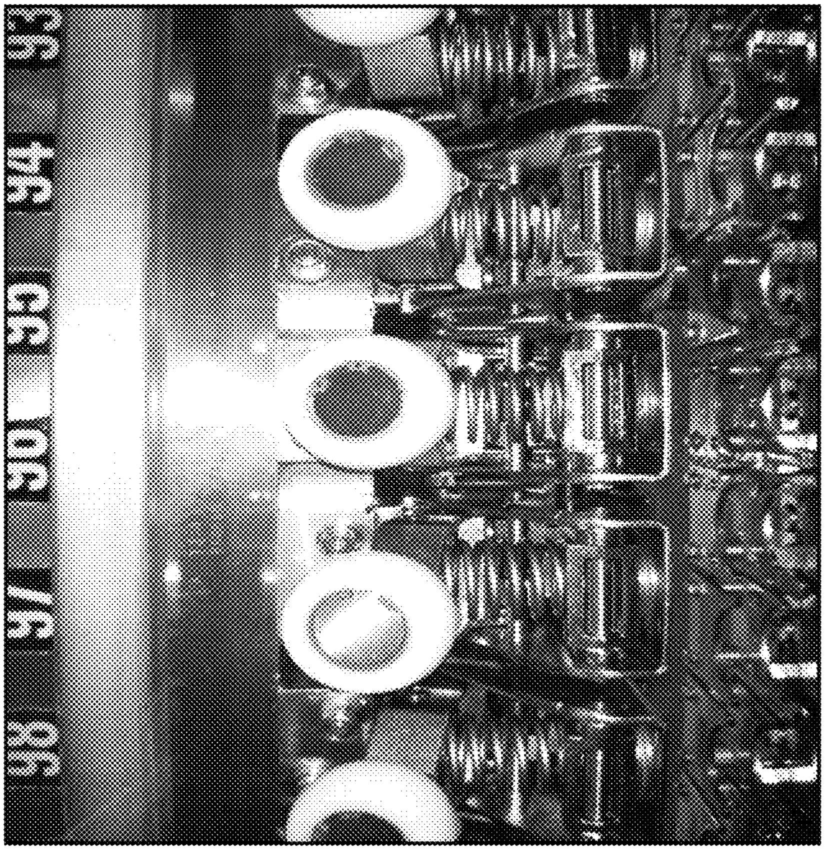
FIGS. 6A and 6B are photographs of springs of a filler system without (FIG. 6A) and with (FIG. 6B) application of a treatment solution according to an embodiment.
Figure 6A:
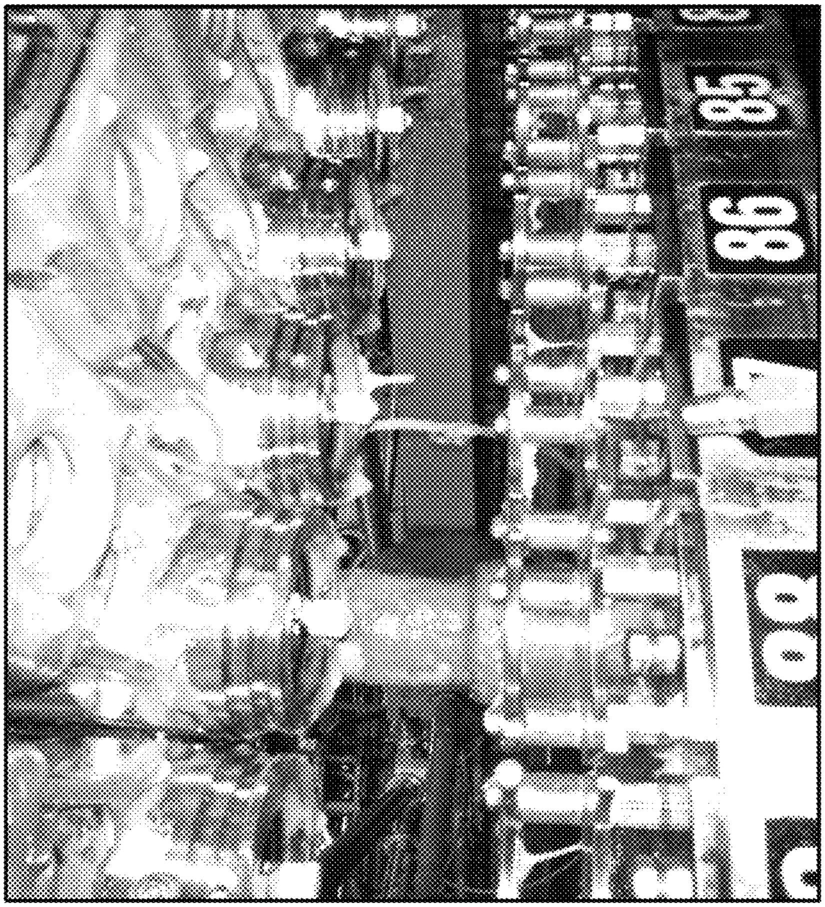

FIGS. 6A and 6B shows springs of a filler system without (FIG. 6A) and with (FIG. 6B) application of a treatment solution according to an embodiment.

Example 3

Figure 7B:
FIGS. 7A and 7B are photographs of a portion behind the pistons of a filler system without (FIG. 7A) and with (FIG. 7B) application of a treatment solution according to an embodiment.
Figure 7A:
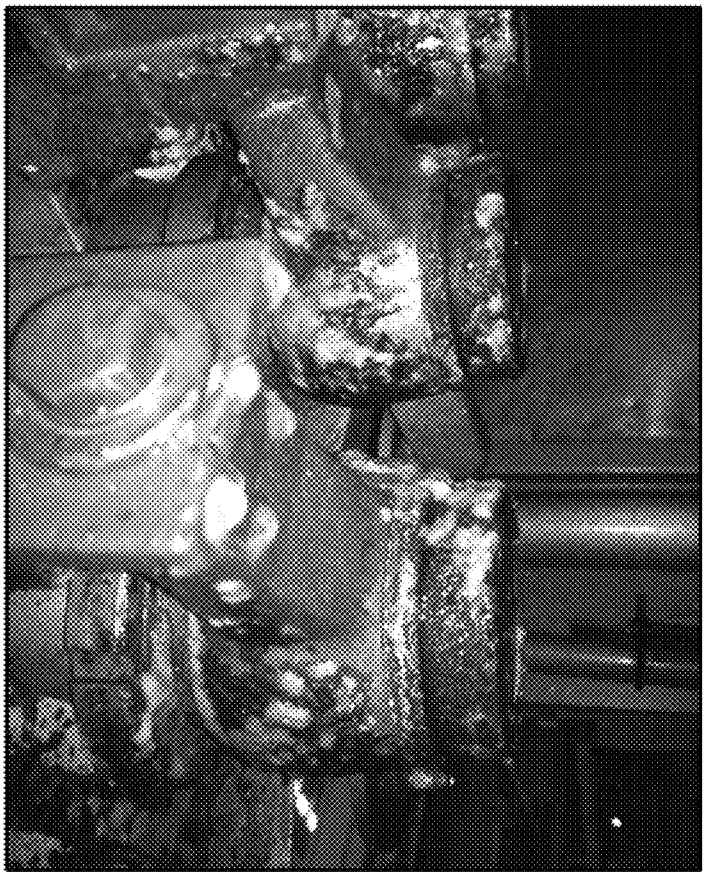

FIGS. 7A and 7B shows a portion behind the pistons of a filler system without (FIG. 7A) and with (FIG. 7B) application of a treatment solution according to an embodiment.

Example 4

Figure 8A:
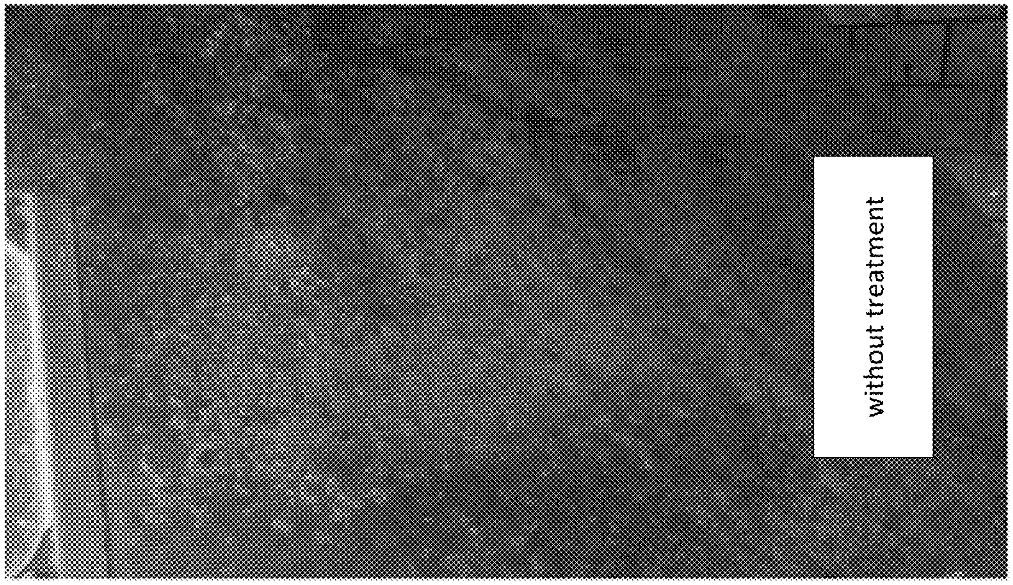
FIGS. 8A and 8B are photographs of filler doors of a filler system without (FIG. 8A) and with (FIG. 8B) application of a treatment solution according to an embodiment.
Figure 8B:
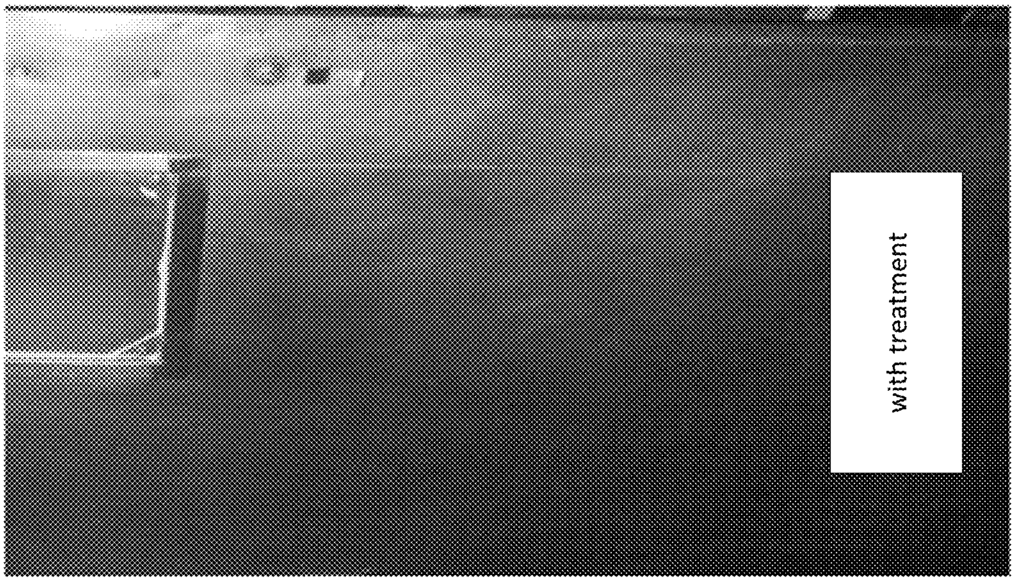

FIGS. 8A and 8B shows filler doors of a filler system without (FIG. 8A) and with (FIG. 8B) application of a treatment solution according to an embodiment.

As seen in FIGS. 5A, 6A, 7A and 8A, there is substantial contamination and soil build-up on the surfaces of the respective system components. In contrast, in FIGS. 5B, 6B, 7B and 8B, the surfaces are clean and contamination and soil build-up are noticeably absent. These photographs clearly illustrate the efficacy of the disclosed online methods on filler system components in terms of preventing soiling and maintaining a clean and functional operating environment.

It will be appreciated that the above-disclosed features and functions, or alternatives thereof, may be desirably combined into different methods and systems. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A method for online cleaning of a carbonated soft drink filler device that is prone to accumulating spillage from spilled carbonated soft drink that can provide a growth environment for bacteria, the filler device having a filling chamber configured to fill beverage containers with a carbonated soft drink in a filling direction, a conveyor configured to transport the beverage containers in a conveyance direction through the filler device along a conveyance path having at least one loop portion that loops in a plane perpendicular to the filling direction and includes the filling chamber, the method comprising:

while the filler device is filling the beverage containers with the carbonated soft drink, delivering a cleaning solution that comprises an acidified sodium chlorite solution to the filler device via a pressurized nozzle arrangement that includes at least one top nozzle that is arranged to spray the cleaning solution on an upper portion of the filler device in the loop portion, at least one middle nozzle that is arranged to spray the cleaning solution on a middle portion of the filler device in the loop portion, and at least one lower nozzle that is arranged to spray the cleaning solution on a lower portion of the filler device in the loop portion, and wherein the acidified sodium chlorite solution includes from 5-35% of chlorous acid and from 65-95% chlorite.

2. The method for online cleaning of a carbonated soft drink filler device according to claim 1, wherein the nozzle arrangement distributes the cleaning solution to at least one of externally facing and internally facing surfaces of the filler device in the at least one loop portion.

3. The method for online cleaning of a carbonated soft drink filler device according to claim 1, wherein the nozzle arrangement distributes the cleaning solution to 50% to 100% of a surface area of the filler device in the at least one loop portion.

4. The method for online cleaning of a carbonated soft drink filler device according to claim 1, wherein the nozzle arrangement distributes the cleaning solution to 50% to 99% of a surface area of the filler device in the at least one loop portion.

5. The method for online cleaning of a carbonated soft drink filler device according to claim 1, wherein the nozzle arrangement distributes the cleaning solution to 80% to 99% of a surface area of the filler device in the at least one loop portion.

6. The method for online cleaning of a carbonated soft drink filler device according to claim 1, wherein the nozzle arrangement distributes the cleaning solution to 100% of a surface area of the filler device in the at least one loop portion.

7. The method for online cleaning of a carbonated soft drink filler device according to claim 1, wherein the delivering step includes continuous delivery of the cleaning solution to the filler device while the device is online.

8. The method for online cleaning of a carbonated soft drink filler device according to claim 1, wherein the delivering step includes intermittent delivery of the cleaning solution to the filler device while the filler device is online.

9. The method for online cleaning of a carbonated soft drink filler device according to claim 8, wherein the intermittent delivery includes delivering the cleaning solution on a schedule including a plurality of cycles, each cycle including in a range of 15 seconds to 2 minutes of continuous delivery followed by in a range of 12 minutes to 15 minutes of continuous no delivery.

10. The method for online cleaning of a carbonated soft drink filler device according to claim 1, wherein the pressurized nozzle arrangement is further configured to rinse and clean beverage containers exiting from the at least one loop portion of the filler device.

11. The method for online cleaning of a carbonated soft drink filler device according to claim 1, further comprising a driving mechanism that includes pistons configured to drive respective beverage containers up and down in the filling direction for filling while the beverage containers are transported along the conveyance path in the at least one loop portion.

12. The method for online cleaning of a carbonated soft drink filler device according to claim 1, further comprising mixing a sodium chlorite solution with citric acid to produce the acidified sodium chlorite solution.

13. The method for online cleaning of a carbonated soft drink filler device according to claim 1, wherein the at least one top nozzle is oriented downwardly to spray the cleaning solution downwardly onto the upper portion of the filler device.

14. The method for online cleaning of a carbonated soft drink filler device according to claim 1, wherein the at least one lower nozzle is oriented upwardly to spray the cleaning solution upwardly onto the lower portion of the filler device.

15. The method for online cleaning of a carbonated soft drink filler device according to claim 7, wherein a rate of the continuous delivery is variable based on a machine learning algorithm.

16. The method for online cleaning of a carbonated soft drink filler device according to claim 9, wherein the schedule is based on a machine learning algorithm.

* * * * *